(12) United States Patent
Gorokhov et al.

(10) Patent No.: US 8,923,143 B2
(45) Date of Patent: Dec. 30, 2014

(54) OPEN LOOP CHANNEL REPORTING IN A WIRELESS COMMUNICATION SYSTEM

(75) Inventors: Alexei Yurievitch Gorokhov, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 12/822,086

(22) Filed: Jun. 23, 2010

(65) Prior Publication Data

US 2011/0149765 A1    Jun. 23, 2011

Related U.S. Application Data

(60) Provisional application No. 61/221,478, filed on Jun. 29, 2009.

(51) Int. Cl.
| | |
|---|---|
| *H04J 1/16* | (2006.01) |
| *H04L 1/00* | (2006.01) |
| *H04L 1/06* | (2006.01) |
| *H04L 25/03* | (2006.01) |

(52) U.S. Cl.
CPC ............ *H04L 1/0026* (2013.01); *H04L 1/0035* (2013.01); *H04L 1/0631* (2013.01); *H04L 2025/03426* (2013.01)
USPC .......................................... 370/252; 370/329

(58) Field of Classification Search
CPC ....... H04L 1/0023; H04L 1/0026; H04L 1/20; H04W 28/0231; H04W 72/08; H04W 72/085; H04W 72/087; H04W 72/1226
USPC ..................... 370/252, 310–350; 455/69, 450
See application file for complete search history.

(56) References Cited

U.S. PATENT DOCUMENTS

| | | | |
|---|---|---|---|
| 2007/0097856 A1* | 5/2007 | Wang et al. .................... | 370/210 |
| 2007/0217540 A1 | 9/2007 | Onggosanusi et al. | |

(Continued)

FOREIGN PATENT DOCUMENTS

| | | |
|---|---|---|
| CN | 101286824 A | 10/2008 |
| JP | 2010537599 A | 12/2010 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 8) 3GPP Standard; 3GPP TS 36.213, 3rd Generation Partnership Project (3GPP), Mobile Competence Centre ; 650, Route des Lucioles ; F-06921 Sophia-Antipolis Cedex ; France, No. V8.7.0, May 1, 2009, pp. 1-81, XP050377562 the whole document.

(Continued)

*Primary Examiner* — Kan Yuen
(74) *Attorney, Agent, or Firm* — Dalei Dong (57) ABSTRACT

Techniques for reporting channel quality indicator (CQI) in a wireless communication system are described. In one design, a UE determines CQI based on an assumption of a set of precoding matrices being used by a base station for data transmission to the UE. The base station may or may not actually use the set of precoding matrices assumed by the UE. The UE sends the CQI to the base station and thereafter receives data transmission sent by the base station based on the CQI. In one design, the UE determines the set of precoding matrices for a set of time-frequency resources available for data transmission to the UE. The UE determines the received signal quality of each time-frequency resource based on a precoding matrix for that time-frequency resource. The UE then determines the CQI based on the received signal qualities of the set of time-frequency resources.

33 Claims, 5 Drawing Sheets

(56) References Cited

U.S. PATENT DOCUMENTS

| | | | |
|---|---|---|---|
| 2007/0223423 A1 | 9/2007 | Kim et al. | |
| 2008/0043677 A1* | 2/2008 | Kim et al. | 370/332 |
| 2008/0080637 A1* | 4/2008 | Khan et al. | 375/267 |
| 2008/0096488 A1* | 4/2008 | Cho et al. | 455/69 |
| 2008/0118004 A1* | 5/2008 | Forenza et al. | 375/299 |
| 2009/0046569 A1* | 2/2009 | Chen et al. | 370/203 |
| 2009/0046570 A1* | 2/2009 | Sarkar et al. | 370/203 |
| 2009/0163199 A1 | 6/2009 | Kazmi et al. | |
| 2009/0307558 A1* | 12/2009 | Lee et al. | 714/749 |
| 2010/0002598 A1* | 1/2010 | Pan et al. | 370/252 |
| 2010/0041344 A1* | 2/2010 | Kim et al. | 455/69 |
| 2010/0189191 A1 | 7/2010 | Taoka et al. | |
| 2010/0284351 A1 | 11/2010 | Liang et al. | |
| 2010/0323712 A1* | 12/2010 | Guey et al. | 455/452.2 |
| 2011/0045783 A1* | 2/2011 | Luschi et al. | 455/69 |
| 2011/0235567 A1* | 9/2011 | Seo et al. | 370/312 |
| 2012/0051257 A1* | 3/2012 | Kim et al. | 370/252 |
| 2012/0076032 A1* | 3/2012 | Mundarath et al. | 370/252 |

FOREIGN PATENT DOCUMENTS

| | | |
|---|---|---|
| WO | WO-2008156081 A1 | 12/2008 |
| WO | WO-2009023860 A1 | 2/2009 |
| WO | WO-2009033358 A1 | 3/2009 |
| WO | WO-2009072960 A2 | 6/2009 |
| WO | WO-2009074880 A2 | 6/2009 |

OTHER PUBLICATIONS

Catt: "Feedback mechanism analysis of dual layer beamforming for TDD system" 3GPP Draft; R1-092181, 3rd Generation Partnership Project (3GPP), Mobile Competence Centre ; 650, Route des Lucioles ; F-06921 Sophia-Antipolis Cedex ; France, No. San Francisco, USA; Apr. 30, 2009, XP050339615 [retrieved on Apr. 30, 2009] the whole document.

Ericsson: "DL MIMO for LTE-Advanced" 3GPP Draft; R1-092028, 3rd Generation Partnership Project (3GPP), Mobile Competence Centre ; 650, Route des Lucioles ; F-06921 Sophia-Antipolis Cedex ; France, No. San Francisco, USA; Apr. 28, 2009, XP050339496 [retrieved on Apr. 28, 2009] the whole document.

International Search Report and Written Opinion—PCT/US2010/040308, International Search Authority—European Patent Office—Nov. 8, 2010.

Qualcomm Europe: "Feedback considerations for DL MIMO and CoMP" 3GPP Draft; R1-092695, 3rd Generation Partnership Project (3GPP), Mobile Competence Centre ; 650, Route des Lucioles ; F-06921 Sophia-Antipolis Cedex ; France, No. Los Angeles, USA; Jun. 24, 2009, XP002604076 [retrieved on Jun. 24, 2009] the whole document.

Qualcomm Europe: "Feedback options in support of dual-stream beamforming" 3GPP Draft; R1-091449, 3rd Generation Partnership Project (3GPP), Mobile Competence Centre ; 650, Route des Lucioles ; F-06921 Sophia-Antipolis Cedex ; France, No. Seoul, South Korea; Mar. 19, 2009, XP002603904 [retrieved on Mar. 19, 2009] the whole document.

Qualcomm Europe: "Open Loop MIMO transmission in LTE-A" 3GPP Draft; R1-092716, 3rd Generation Partnership Project (3GPP), Mobile Competence Centre ; 650, Route des Lucioles ; F-06921 Sophia-Antipolis Cedex ; France, No. Los Angeles, USA; Jun. 24, 2009, XP002604075 [retrieved on Jun. 24, 2009] the whole document.

Catt, et al., "Way forward on RS Design for LTE-Advanced", 3GPP TSG-RAN WG1 #56bis, R1-091655, Seoul, Korea, Mar. 23-Mar. 27, 2009.

Alcatel-Lucent, et al., "Way forward on further considerations on RS Design for LTE-A (revised)", 3GPP TSG-RAN WG1 #56bis, R1-091657, Seoul, Korea, Mar. 23-Mar. 27, 2009.

Qualcomm Europe, "TP for feedback in support of DL CoMP for LTE-A TR" 3GPP TSG-RAN WG1 #57, R1-092284, May 4-8, 2009 San Francisco, CA. USA.

3rd Generation Partnership Project; Technical Specification Group Radio Access Network; Evolved Universal Terrestrial Radio Access (E-UTRA); Physical layer—Measurements (Release 8), 3GPP TS 36.214 V8.6.0 (Mar. 2009), Sophia Antipolis Valbonne—France.

Taiwan Search Report—TW099121293—TIPO—Mar. 11, 2013.

* cited by examiner

OPEN LOOP CHANNEL REPORTING IN A WIRELESS COMMUNICATION SYSTEM

The present application claims priority to provisional U.S. Application Ser. No. 61/221,478, entitled "FEEDBACK MODES IN SUPPORT OF DL TRANSMISSION IN LTE-A," filed Jun. 29, 2009, assigned to the assignee hereof and incorporated herein by reference.

BACKGROUND

I. Field

The present disclosure relates generally to communication, and more specifically to techniques for reporting channel information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data via a wireless channel to a UE. Good performance may be achieved by having the UE estimate the wireless channel and report channel information to the base station. The base station may then transmit data based on the reported channel information. The characteristics of the wireless channel may vary over time due to various factors such as fading, multipath, interference, etc. Furthermore, the UE may be mobile and may observe different channels as the UE moves about. There is therefore a need in the art for techniques to accurately report channel information in a wireless communication system.

SUMMARY

Techniques for reporting channel quality indicator (CQI) in a wireless communication system are described herein. In an aspect, an open-loop reporting mode may be used for CQI reporting under certain operating scenarios (e.g., high mobility scenarios) when transmit diversity is desired. The open-loop reporting mode may result in more accurate CQI being reported, which may improve performance of data transmission.

In one design, a UE may determine CQI based on an assumption of a set of precoding matrices being used by a base station for data transmission to the UE. The base station may or may not actually use the set of precoding matrices assumed by the UE. The UE does not send feedback to convey the set of precoding matrices. The UE may send the CQI to the base station and may thereafter receive data transmission sent by the base station to the UE based on the CQI. The data transmission may be sent with precoding with a plurality of precoding matrices to obtain transmit diversity. The plurality of precoding matrices used by the base station may include zero, some, or all precoding matrices in the set of precoding matrices assumed by the UE.

In one design, the UE may determine the set of precoding matrices for a set of time-frequency resources (e.g., a set of resource blocks) available for data transmission to the UE. The UE may determine the received signal quality of each time-frequency resource based on a precoding matrix for that time-frequency resource. The UE may then determine the CQI based on the received signal qualities of the set of time-frequency resources.

In one design, the UE may evaluate different possible ranks that can be used for data transmission to the UE. The UE may determine a set of precoding matrices for each possible rank. The UE may determine a metric for each rank based on the set of precoding matrices for that rank. The UE may select one of the possible ranks based on the metrics for all ranks. The UE may then determine CQI for the selected rank based on the set of precoding matrices for the selected rank. The UE may send rank indicator (RI) indicative of the selected rank to the base station. The base station may send data transmission comprising L data packets to the UE, where L may be based on the selected rank.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
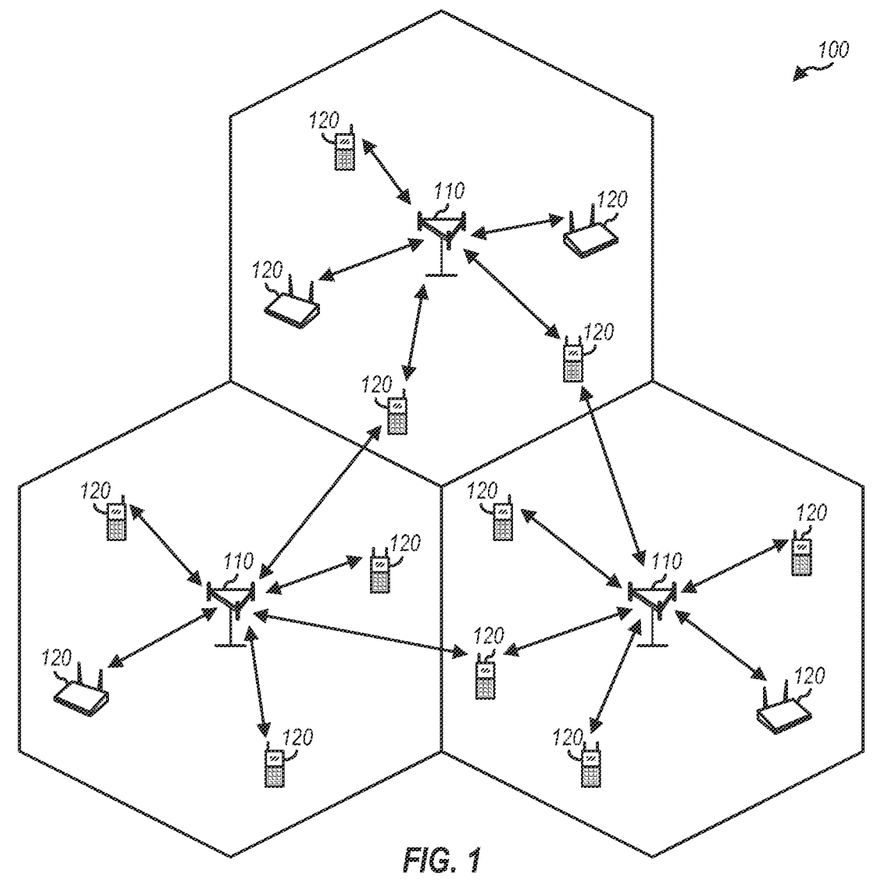
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a Node B, a base station, an access point, etc. Each eNB may provide communication coverage for a particular geographic area and may support communication for the UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

A number of UEs may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively. The system bandwidth may also be partitioned into subbands, and each subband may cover a range of frequencies, e.g., 1.25 MHz. The system bandwidth may also be partitioned into bandwidth parts, and each bandwidth part may cover a configurable frequency range, e.g., an integer number of subbands.

Figure 2:
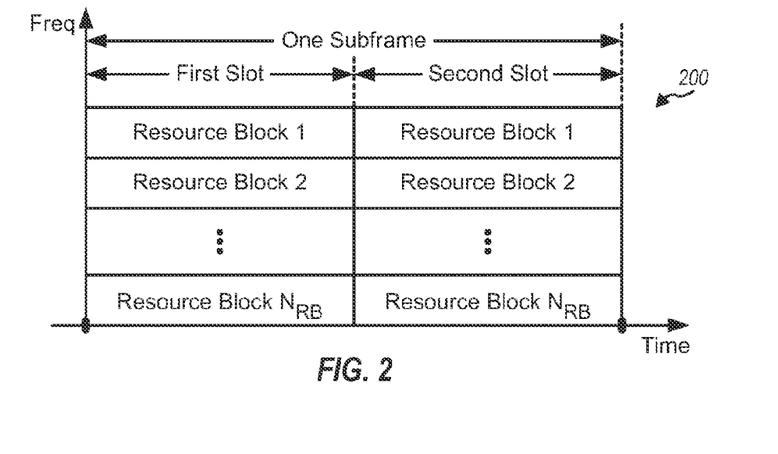
FIG. 2 shows an exemplary resource structure.

FIG. 2 shows an exemplary resource structure 200 used in LTE. The transmission timeline may be partitioned into units of subframes. Each subframe may have a predetermined duration (e.g., one millisecond (ms)) and may be partitioned into two slots. Each slot may include S symbol periods, e.g., seven symbol periods for a normal cyclic prefix or six symbol periods for an extended cyclic prefix.

$N_{RB}$ resource blocks (RBs) may be defined for each slot with the $N_{FFT}$ total subcarriers and may also be referred to as physical resource blocks (PRBs). The number of resource blocks in each slot may be dependent on the system bandwidth and may range from 6 to 110 for system bandwidth of 1.25 to 20 MHz, respectively. Each resource block may cover 12 subcarriers in one slot and may include a number of resource elements. Each resource element may cover one subcarrier in one symbol period and may be used to transmit one modulation symbol, which may be a real or complex value.

Figure 3:
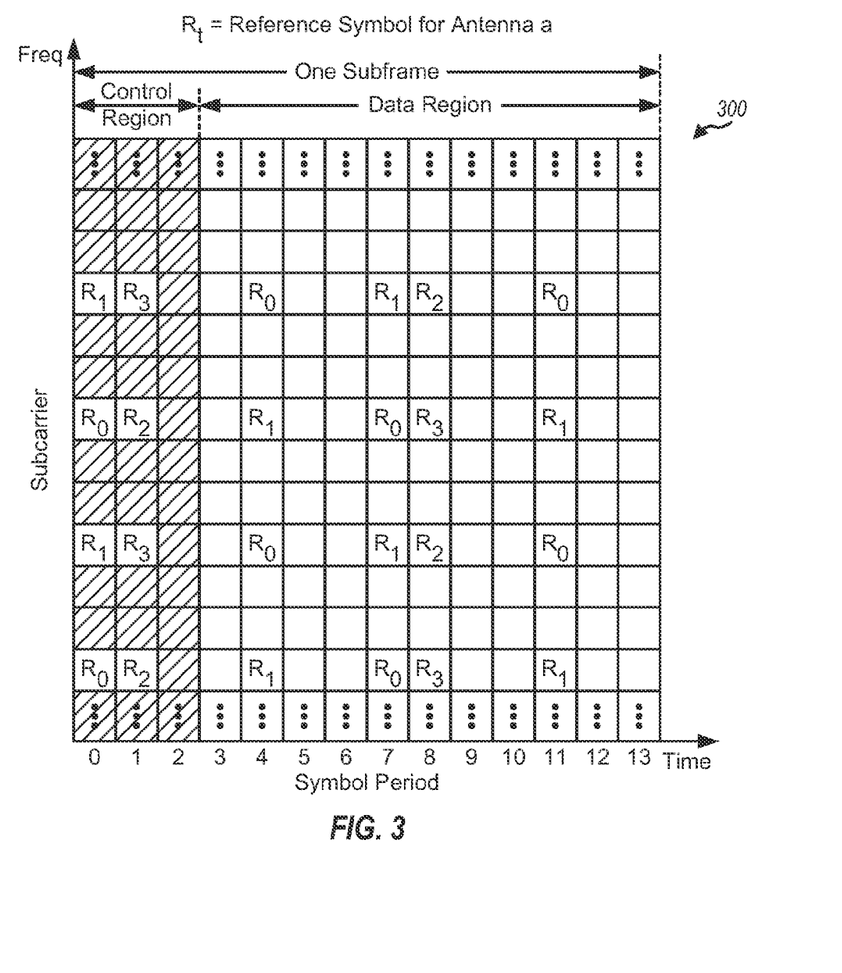
FIG. 3 shows an exemplary subframe format.

FIG. 3 shows an exemplary subframe format 300 for the downlink with the normal cyclic prefix. Subframe format 300 may be used for an eNB equipped with four antennas. A cell-specific reference signal (CRS) may be transmitted from antennas 0 and 1 in symbol periods 0, 4, 7 and 11 and from antennas 2 and 3 in symbol periods 1 and 8. A reference signal is a signal that is known a priori by a transmitter and a receiver and may also be referred to as pilot. A CRS is a reference signal that is specific for a cell, e.g., generated based on a cell identity (ID). In FIG. 3, for a given resource element with label $R_t$, for t=0, 1, 2 or 3, a modulation symbol may be transmitted on that resource element from antenna t, and no modulation symbols may be transmitted on that resource element from the other antennas. Resource elements not used for the CRS may be used to transmit data and/or control information.

The system may support multi-antenna transmission techniques to achieve high spectral efficiency. These multi-antenna transmission techniques may include single-user multiple-input multiple-output (SU-MIMO), multi-user MIMO (MU-MIMO), and coordinated multi-point (CoMP), which are briefly described in Table 1. MU-MIMO may also be referred to as intra-cell MU-MIMO or spatial division multiple access (SDMA). CoMP may also be referred to as inter-cell MU-MIMO.

TABLE 1

| Technique | Description |
|---|---|
| SU-MIMO | Transmission of data from a cell to a UE with MIMO. |
| MU-MIMO | Transmission of data from a cell to multiple UEs with MIMO. |
| CoMP | Transmission of data from multiple cells to one or more UEs. |

A UE may determine channel information and may report this information to its serving eNB in order to support the multi-antenna transmission techniques. In general, channel information may comprise any information that may be used by a transmitter to transmit data to a receiver. Channel information may comprise channel quality indicator (CQI), rank indicator (RI), precoding matrix indicator (PMI), etc. CQI may be indicative of the quality of a communication channel from the transmitter to the receiver. RI may be indicative of the number of data streams to transmit simultaneously to the receiver. Each data stream may correspond to a codeword, a data packet, a transport block, a spatial channel, etc. PMI may be indicative of a precoding matrix to use to spatially process (or precode) data prior to transmission to the receiver. A precoding matrix may correspond to a spatial beam that may steer data transmission toward the receiver and/or away from other receivers.

In an aspect, multiple reporting modes may be supported for reporting channel information and may include a closed-loop reporting mode and an open-loop reporting mode. Table 2 provides a brief description of each of the two reporting modes. The closed-loop reporting mode may be used for low mobility UEs and also for high mobility UEs with persistent spatial characteristics, e.g. due to correlated antenna configurations. The open-loop reporting mode may be used for high mobility UEs and also when feedback of PMI is unavailable.

TABLE 2

| Reporting Mode | Description |
|---|---|
| Closed-Loop Reporting Mode | CQI is determined for one or more precoding matrices used for data transmission and reported by a UE. |
| Open-Loop Reporting Mode | CQI is determined for a set of precoding matrices, which may or may not be used for data transmission and is not reported by a UE. |

Figure 4:
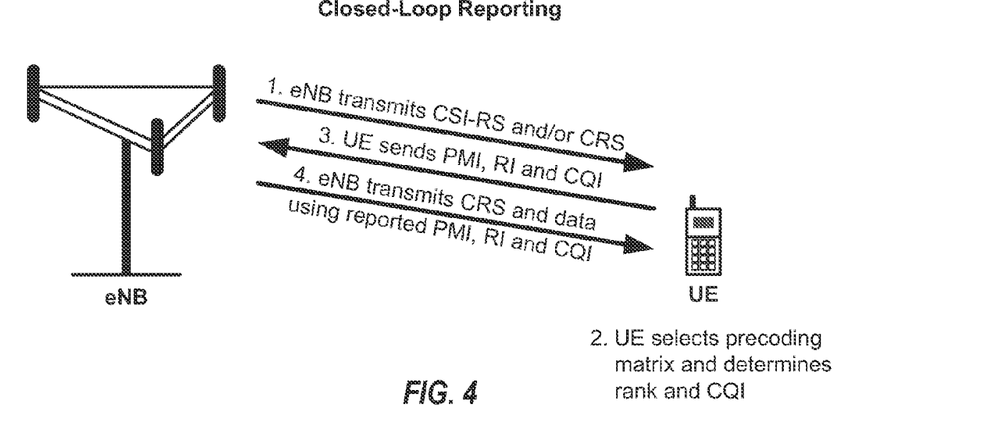
FIG. 4 shows operation of a closed-loop reporting mode.

FIG. 4 shows operation of the closed-loop reporting mode for SU-MIMO. An eNB may transmit a channel state information reference signal (CSI-RS) and/or a CRS on the downlink (step 1). CSI-RS is a reference signal sent from all transmit antennas and may be used for CQI measurement. A UE may receive the CSI-RS and/or CRS from the eNB and may evaluate the wireless channel from the eNB to the UE. For example, the UE may obtain a channel estimate based on the CSI-RS and/or CRS and may evaluate different possible precoding matrices of different ranks that can be used for data transmission to the UE. A codebook of precoding matrices may be supported for each possible rank, and each precoding matrix may be assigned a unique index. For each possible precoding matrix of a given rank, the UE may determine a metric (e.g., for spectral efficiency, throughput, etc.) for that precoding matrix. The UE may select the precoding matrix with the best metric, determine PMI and RI based on the selected precoding matrix, and determine CQI with the selected precoding matrix (step 2). The PMI may comprise an index of the selected precoding matrix. The UE may then send channel information comprising the PMI, RI and CQI to the eNB (step 3). The UE may determine and report channel information for wideband (e.g., the entire system bandwidth) or narrowband for each frequency unit of interest. Each frequency unit may correspond to a subband, or a bandwidth part, or some other unit of frequency.

The eNB may transmit data to the UE using the reported PMI, RI and CQI (step 4). For example, the eNB may determine the number of packets or codewords to transmit based on the reported RI and may encode and modulate each packet based on a modulation and coding scheme (MCS) determined based on the reported CQI. The eNB may also perform precoding on the data based on the reported PMI.

The closed-loop reporting mode may be used for SU-MIMO, MU-MIMO, and CoMP. For SU-MIMO, the UE may select a precoding matrix with the best metric among all possible precoding matrices and may determine RI and CQI based on the selected precoding matrix. The CQI may be an accurate estimate of the channel quality if the eNB uses the precoding matrix selected by the UE and sent to the eNB via the PMI.

For MU-MIMO, an eNB may transmit to multiple UEs simultaneously. Each UE may evaluate the wireless channel from the eNB to that UE in similar manner as for SU-MIMO and may report PMI, RI and CQI to the eNB. The eNB may schedule a set of UEs for data transmission with MU-MIMO. The eNB may select a precoding matrix based on the PMIs from all scheduled UEs such that data is steered toward these UEs. For example, the precoding matrix may be selected to match the preferred beams of all scheduled UEs as best as possible. Alternatively or additionally, the eNB may select a precoding matrix that minimizes multi-user (MU) interference to the scheduled UEs based on the PMIs from the scheduled UEs. The eNB may then transmit data to the scheduled UEs using the selected precoding matrix.

For MU-MIMO, each UE may select the best precoding matrix for its wireless channel to the eNB without knowledge of the other scheduled UE(s) and may determine RI and CQI based on the selected precoding matrix. Each UE may not have information about the other co-scheduled UE(s) and their preferred beams prior to the scheduling decisions by the eNB. Each UE may be unable to accurately estimate short-term multi-user interference resulting from the precoding matrix selected by the eNB when determining CQI and RI. The eNB may make adjustments to the RI and/or CQI of the scheduled UEs based on its scheduling decisions. For example, the eNB may predict MU interference based on a PMI reported by a UE and may determine whether MU-MIMO or SU-MIMO scheduling would provide better performance. Once MU interference is determined, the eNB may estimate the total interference observed by the UE by adding the MU interference component to the remaining interference component (e.g., from other cell plus thermal noise) which may be roughly inferred from the CQI reported by the UE.

For each scheduled UE, the eNB may select the number of codewords and a modulation and coding scheme for each codeword based on the received or adjusted RI and CQI for that UE. There may be some errors between the CQI used by the eNB for each scheduled UE and the actual CQI observed by that UE. These errors may be accounted for with hybrid automatic retransmission (HARQ). For HARQ on the downlink, the eNB may send a transmission of a codeword and may send one or more additional transmissions of the codeword, if needed, until the codeword is decoded correctly by a UE, or the maximum number of transmissions has been sent, or some other termination condition is encountered.

For CoMP, multiple cells of one or more eNBs may transmit data to one or more UEs simultaneously. Each UE may evaluate the wireless channel from different cells to that UE in similar manner as for SU-MIMO and may report PMI, RI and CQI to the serving cell. A set of UEs may be scheduled for data transmission from multiple cells with CoMP. A precoding matrix may be selected for each cell for the scheduled UEs based on the PMIs from all scheduled UEs such that data is steered toward these UEs. Each cell may transmit data to the scheduled UEs using the precoding matrix selected for that cell. The multiple cells may transmit data to the scheduled UEs at the same or different transmit power levels.

For CoMP, each UE may select the best precoding matrix for its wireless channel to different cells without knowledge of other information such as which other UEs will be scheduled with that UE, the preferred beams of these other UEs, the transmit power levels used by the cells for different UEs, etc. Each UE may determine RI and CQI based on the precoding matrix selected by that UE. Each UE may not have information about the other co-scheduled UE(s) and their preferred beams prior to the scheduling decisions. Each UE may thus be unable to accurately estimate short-term multi-user interference when determining CQI and RI. The RI and/or CQI of the scheduled UEs may be adjusted based on the scheduling decisions.

For both MU-MIMO and CoMP, more accurate CQI reporting by UEs may be achieved by having each eNB transmit a precoded reference signal prior to actual data transmission by that eNB. The precoded reference signal may be generated based on a precoding matrix that will be used for subsequent data transmission. Each UE may determine RI and CQI based on the precoded reference signal (without evaluating different possible precoding matrices). The eNBs may also exchange precoding information indicative of the precoding matrices selected by these eNBs via the backhaul. The use of precoded reference signals may allow the UEs to more accurately estimate short-term interference conditions. This may in turn result in more accurate RI and CQI reporting by the UEs, better selection of UEs to be scheduled together based on the RI/CQI reports from the UEs, and more accurate selection of modulation and coding schemes for the scheduled UEs.

In another aspect, the open-loop reporting mode may be used for CQI reporting under certain operating scenarios when transmit diversity is desired. For example, the open-loop reporting mode may be used for high mobility scenarios, or low geometry scenarios, or when feedback of PMI is unavailable, etc. The open-loop reporting mode may result in reporting of more accurate CQI, which may improve performance of data transmission.

Figure 5:
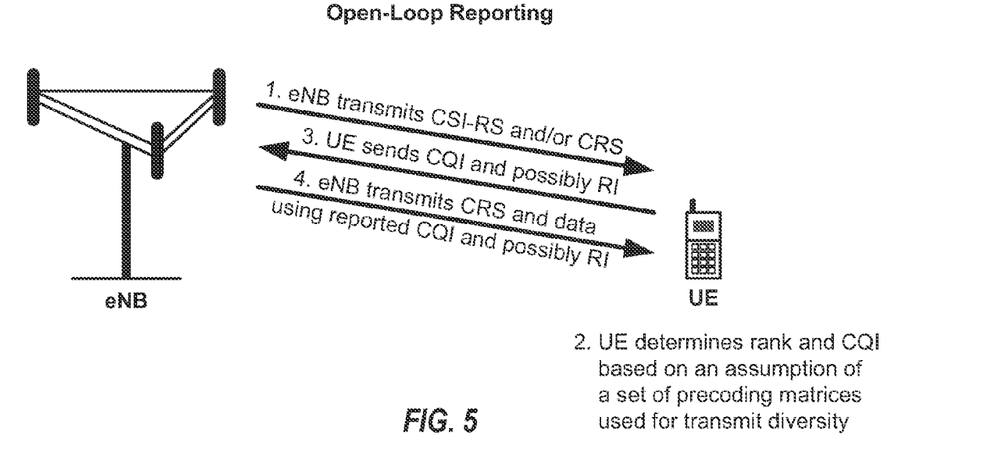
FIG. 5 shows operation of an open-loop reporting mode.

FIG. 5 shows operation of the open-loop reporting mode for SU-MIMO. An eNB may transmit a CSI-RS and/or a CRS on the downlink (step 1). A UE may receive the CSI-RS and/or CRS from the eNB and may evaluate the wireless channel from the eNB to the UE. For example, the UE may obtain a channel estimate based on the CSI-RS and/or CRS and may determine CQI based on an assumption of transmit diversity being used for subsequent data transmission to the UE, as described below. The UE may determine CQI and possibly RI based on the CSI-RS and/or CRS and further based on the assumption of transmit diversity (step 2). The UE may then send channel information comprising the CQI and possibly RI to the eNB (step 3). The UE may determine and report channel information for wideband or narrowband. The eNB may transmit data to the UE using the reported CQI and possibly RI (step 4).

The open-loop reporting mode may be used for SU-MIMO, MU-MIMO and CoMP. This reporting mode may be used for high-mobility UEs when short-term channel and interference conditions may fluctuate rapidly and hence should not be used to determine CQI and RI for an upcoming data transmission. Since beam-steering may be impractical in high-mobility scenarios, transmit diversity may be used to ensure reliable data transmission. In one design of transmit diversity, an eNB may transmit data using different precoding matrices on different time and/or frequency resources (e.g., in different subframes or different groups of resource blocks) so that a recipient UE can observe an ensemble of effective channels defined by these precoding matrices. This may allow the UE to observe the average channel conditions and avoid the worst-case channel conditions.

Precoding matrices may be selected in various manners for the open-loop reporting mode. In one design, which may be referred to as loosely defined open-loop transmission, a UE may assume that an eNB will pseudo-randomly select different precoding matrices for different resource blocks. The selected precoding matrices may be from a codebook of precoding matrices supported for the closed-loop reporting mode or may be precoding matrices selected in other manners. In another design, which may be referred to as tightly defined open-loop transmission, the UE may assume a specific precoding matrix for each resource block based on a predetermined mapping of precoding matrices to resource blocks. This mapping may be known a priori by the UE and the eNB. In yet another design, the UE may cycle through a sequence of precoding matrices and may select one precoding matrix in the sequence for each resource block on which to compute CQI. Precoding matrices may also be selected in other manners for the open-loop reporting mode.

In one design, different precoding matrices may be selected for different resource blocks on which to compute CQI. In another design, different precoding matrices may be selected for different subbands on which to compute CQI. In general, different precoding matrices may be selected for different time-frequency resources. Each time-frequency resource may cover any suitable time duration and any suitable frequency range. Each precoding matrix may include one vector for each transmit antenna at an eNB. Different sets of precoding matrices may be used for different numbers of transmit antennas. For example, a first set of precoding matrices (each with two vectors) may be used for two transmit antennas at the eNB, a second set of precoding matrices (each with four vectors) may be used for four transmit antennas at the eNB, a third set of precoding matrices (each with eight vectors) may be used for eight transmit antennas at the eNB, etc.

In one design, the same precoding matrices may be used for all eNBs. In another design, different precoding matrices (or different sets of precoding matrices) may be used for different eNBs. This design may randomize interference conditions.

To support CQI measurement, an eNB may transmit a CSI-RS and/or a CRS from all transmit antennas (or antenna ports) of the eNB. The eNB may transmit the CSI-RS and/or CRS on some resource elements of each resource block (e.g., as shown in FIG. 2) or on some resource elements of only certain resource blocks.

A UE may receive the CSI-RS and/or CRS from the eNB. The received CSI-RS or CRS may be expressed as:

$$y(t,k) = h(t,k)r(t,k) + n(t,k), \quad \text{Eq (1)}$$

where
$r(t,k)$ is a reference symbol sent on resource element k from transmit antenna t at the eNB,
$h(t,k)$ is an R×1 channel vector for a wireless channel from transmit antenna t at the eNB to R receive antennas at the UE,
$y(t,k)$ is an R×1 vector containing R received reference symbols from the R receive antennas at the UE, and
$n(t,k)$ is an R×1 vector of noise and interference observed by the UE.

The eNB may transmit a reference symbol from at most one transmit antenna on each resource element, e.g., as shown in FIG. 3. The UE may then be able to estimate the response of the wireless channel for each transmit antenna based on the received reference symbols and using minimum mean square error (MMSE), zero-forcing (ZF), maximal ratio combining (MRC), or some other channel estimation technique. For example, the UE may derive a channel estimate based on MMSE, as follows:

$$\hat{h}(t,k) = \frac{y(t,k) r^*(t,k)}{|r(t,k)|^2 + N_0}, \quad \text{Eq (2)}$$

where
$\hat{h}(t,k)$ is an estimate of $h(t,k)$,
$r^*(t,k)$ is a complex conjugate of $r(t,k)$, and
$N_0$ is the variance of the noise and interference in $n(t,k)$.

The UE may also derive a channel estimate in other manners. The UE may form an estimated channel matrix $\hat{H}(k)$ based on the estimated channel vectors for all T transmit antennas at the eNB, or $\hat{H}(k) = [\hat{h}(1,k)\,\hat{h}(2,k) \ldots \hat{h}(T,k)]$. k may be an index for a set of resource elements on which reference symbols have been transmitted from all T transmit antennas.

The UE may compute an effective channel matrix for each resource element, as follows:

$$G(k) = \hat{H}(k)W(k), \quad \text{Eq (3)}$$

where
W(k) is a T×L precoding matrix of rank L for resource element k, and
G(k) is an R×L effective channel matrix with precoding matrix W(k).

In one design, the UE may use the same precoding matrix W(k) for all resource elements of each resource block and may use different precoding matrices for different resource blocks. In another design, the UE may use different precoding matrices for different resource elements. In general, the UE may use different precoding matrices for different time-frequency resources, and each time-frequency resource may cover any dimension of time and frequency.

The UE may estimate noise and interference based on the effective channel matrix, as follows:

$$I(k) = \|y(k) - G(k)r(k)\|^2, \quad \text{Eq (4)}$$

where
r(k) is a vector of reference symbols sent on resource element k from all T antennas at the eNB, and
I(k) is the estimated noise and interference on resource element k.

Equations (2) to (4) show an exemplary design of noise and interference estimation. Noise and interference may also be estimated in other manner, e.g., as described in 3GPP TS 36.214, entitled "Universal Terrestrial Radio Access (E-UTRA); Physical layer—Measurements," which is publicly available.

The UE may estimate the received signal quality of each resource element. Received signal quality may be quantified by a signal-to-noise-and-interference ratio (SINR), a carrier-to-interference ratio (C/I), etc. The SINR of each resource element may be expressed as:

$$SINR(k) = \frac{P(k)}{I(k)}, \quad \text{Eq (5)}$$

where
P(k) is the transmit power of the reference symbol on resource element k, and
SINR(k) is the SINR of resource element k (in linear unit).

The UE may also estimate the SINR of each resource element in other manners. For example, the UE may estimate SINR based on the received reference symbols, the estimated channel matrix, and the selected precoding matrix and using MMSE or some other technique.

The UE may map the SINR to spectral efficiency based on a capacity/mapping function, as follows:

$$SE(k) = f(SINR(k)), \quad \text{Eq (6)}$$

where
SE(k) is the spectral efficiency for resource element k, and
f( ) denotes a mapping function for spectral efficiency.

The mapping function f( ) may capture various effects such as modulation scheme (e.g., QPSK, 16-QAM, 64-QAM, etc.), SINR loss due to imperfect receiver processing, etc.

The UE may determine an average spectral efficiency for all resource elements of interest as follows:

$$SE_{avg} = \frac{1}{K}\sum_{k} SE(k), \quad \text{Eq (7)}$$

where
K is the number of resource elements to average, and
$SE_{avg}$ is the average spectral efficiency for all resource elements.

The UE may map the average spectral efficiency to a modulation and coding scheme (MCS), which may be reported by the UE in the form of CQI. In one design, the UE may convert the average spectral efficiency to an average SINR, as follows:

$$SINR_{avg} = 2\exp(SE_{avg} - 1), \quad \text{Eq (8)}$$

where "exp" denotes an exponent function.

The UE may convert the average SINR from linear unit to logarithmic unit in decibel (dB). The UE may then map the average SINR (in units of dB) to CQI based on a mapping of different SINR values to different CQI values.

Equations (2) through (8) show an exemplary design of computing an average SINR for a specific precoding matrix W(k). The computation may be performed in other manners. For example, the UE may estimate the channel matrix H(k) and/or the noise and interference I(k) in other manners. The UE may also average I(k), or SINR(k), or some other quantity instead of SE(k) across all resource elements.

In one design, the UE may perform CQI computation (e.g., as described above) for each possible rank that can be selected for the UE. For example, the UE may perform CQI computation for a set of precoding matrices for rank 1 and may obtain one average SINR for one codeword, perform CQI computation for another set of precoding matrices for rank 2 and may obtain two average SINRs for two codewords, etc. Each set of precoding matrices may include one precoding matrix for each time-frequency resource (e.g., each resource block) over which to compute CQI. The UE may select the best rank, which may be associated with the highest overall spectral efficiency or some other metric. The UE may report up to L CQI values for up to L codewords for the selected rank L, where L may be equal to 1, 2, etc. The UE may also report RI indicative of the selected rank L.

In another design, the UE may perform CQI computation for a specific rank that can be used for the UE. This rank may be selected based on the capabilities of the UE, channel conditions, etc. For example, rank 1 may be used if a long-term average SINR is below a threshold, and rank 2 may be used if the long-term average SINR is above the threshold. The UE may report CQI for the specific rank and may skip reporting RI.

In one design, the UE may compute and report CQI for the entire system bandwidth, or for each subband of interest, or for each resource block of interest, or for some other time-frequency resources of interest. The time-frequency resources of interest may be resources on which the UE can be scheduled for data transmission and may be configured for the UE or made known to the UE in other manners.

For both loosely defined and tightly defined open-loop transmissions, the UE may use certain precoding matrices to compute and report CQI. The eNB may transmit data using (i) the same precoding matrices used by the UE to compute CQI (e.g., for SU-MIMO) or (ii) different precoding matrices (e.g., for MU-MIMO or CoMP). The UE may compute and report CQI for certain time-frequency resources. The eNB may schedule the UE on some or all of the time-frequency resources on which the CQI was computed. In any case, there may be some errors between the CQI reported by the UE and the actual CQI observed by that UE. These errors may be accounted for with HARQ.

The open-loop reporting mode may be used for periodic CQI/RI reporting in which a report is sent periodically by the UE. The open-loop reporting mode may also be used for aperiodic CQI/RI reporting in which a report is sent by the UE whenever requested or triggered.

The eNB may receive CQI and possibly RI periodically from the UE. In one design, the eNB may select the number of codewords to transmit to the UE based on the received RI and may select one or more modulation and coding schemes for one or more codewords based on the received CQI. In another design, the eNB may filter the received CQI and possibly RI based on an infinite impulse response (IIR) filter, a finite impulse response (FIR) filter, or some other filter. The eNB may then select the number of codewords to transmit based on the filtered RI and may select one or more modulation and coding schemes based on the filtered CQI.

In one design, the eNB may apply a backoff and may reduce the received or filtered CQI by either a fixed amount or a variable amount. The variable amount of backoff may be dependent on the expected accuracy of the received or filtered CQI. The eNB may then select one or more modulation and coding schemes based on the reduced CQI.

In general, the eNB may process the received CQI and possibly RI based on any function. The eNB may select the number of codewords to transmit to the UE based on the processed RI and may select one or more modulation and coding schemes for one or more codewords based on the processed CQI.

Figure 6:
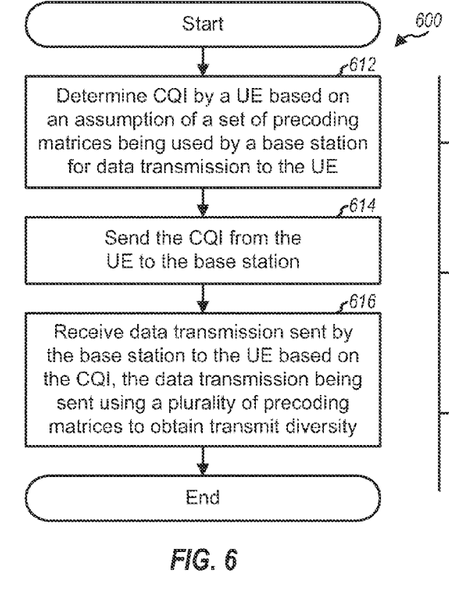
FIG. 6 shows a process for reporting CQI.

FIG. 6 shows a design of a process 600 for reporting CQI. Process 600 may be performed by a UE (as described below) or by some other entity. The UE may determine CQI based on an assumption of a set of precoding matrices being used by a base station for data transmission to the UE (block 612). The base station may or may not actually use the set of precoding matrices assumed by the UE. The UE may send the CQI to the base station but would not send the set of precoding matrices (block 614). The UE may thereafter receive data transmission sent by the base station to the UE based on the CQI (block 616). The data transmission may be sent with precoding with a plurality of precoding matrices to obtain transmit diversity. The plurality of precoding matrices may include zero, some, or all of the precoding matrices in the set of precoding matrices assumed by the UE.

In one design of block 612, the UE may determine the set of precoding matrices for a set of time-frequency resources available for data transmission to the UE. The set of time-frequency resources may correspond to a set of resource blocks, or a set of subbands, or a set of bandwidth parts, or a set of resource elements, or the entire system bandwidth, or some other units of time and frequency. One precoding matrix in the set of precoding matrices may be used for each time-frequency resource, e.g., one precoding matrix for each resource block covering 12 subcarriers in one slot, or for each pair of resource blocks covering 12 subcarriers in one sub-frames, or for some other number of resource blocks. In one design, the UE may select random precoding matrices for the set of time-frequency resources. The set of precoding matrices may then comprise the random precoding matrices. In another design, the UE may use a designated precoding matrix for each time-frequency resource. The set of precoding matrices may then comprise the designated precoding matrix for each time-frequency resource. The UE may also determine the set of precoding matrices in other manners.

The UE may determine the CQI by using the set of precoding matrices for the set of time-frequency resources. In one design, the UE may determine the received signal quality of each time-frequency resource based on a precoding matrix for that time-frequency resource. For each time-frequency resource, the UE may estimate a channel matrix for a wireless channel from the base station to the UE for the time-frequency resource. The UE may determine an effective channel matrix for each time-frequency resource based on the estimated channel matrix and the precoding matrix for the time-frequency resource, e.g., as shown in equation (3). The UE may estimate the received signal quality of each time-frequency resource based on the effective channel matrix for that time-frequency resource. The UE may then determine the CQI based on the received signal qualities of the set of time-frequency resources. In one design, the UE may average the received signal qualities of the set of time-frequency resources to obtain an average received signal quality. The averaging may be performed in various manners, e.g., based on received signal quality, spectral efficiency, etc. The UE may determine the CQI based on the averaged received signal quality.

In one design, the UE may evaluate different possible ranks that can be used for data transmission to the UE. The UE may determine a set of precoding matrices for each of a plurality of ranks. The UE may determine a metric for each rank based on the set of precoding matrices for that rank. The metric may be based on received signal quality, spectral efficiency, throughput, etc. The UE may select one of the plurality of ranks based on the metrics for all of the ranks. The UE may determine CQI for the selected rank based on the set of precoding matrices for the selected rank. The UE may send RI indicative of the selected rank to the base station. The UE may thereafter receive data transmission comprising L data packets or codewords from the base station, where L may be determined based on (e.g., may be equal to) the selected rank.

Figure 7:
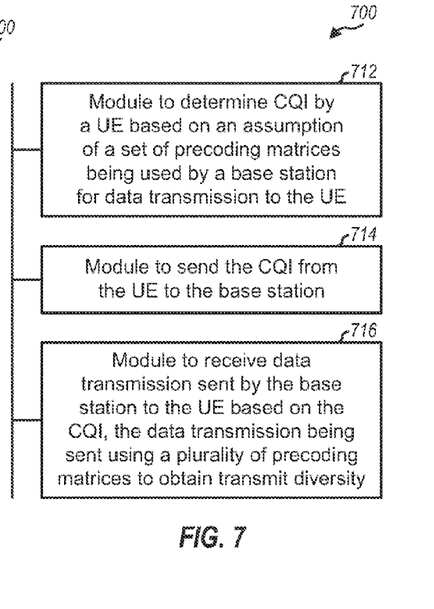
FIG. 7 shows an apparatus for reporting CQI.

FIG. 7 shows a design of an apparatus 700 for reporting CQI. Apparatus 700 includes a module 712 to determine CQI by a UE based on an assumption of a set of precoding matrices being used by a base station for data transmission to the UE, a module 714 to send the CQI from the UE to the base station, and a module 716 to receive data transmission sent by the base station to the UE based on the CQI, the data transmission being sent using a plurality of precoding matrices to obtain transmit diversity.

Figure 8:
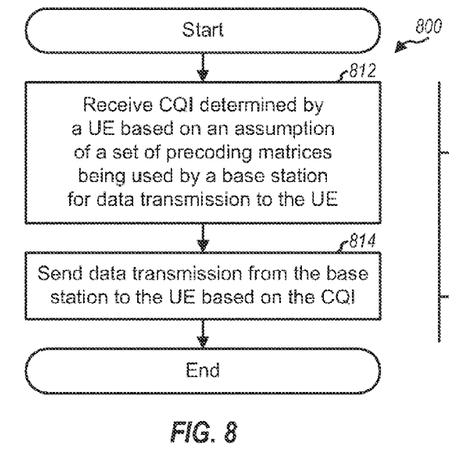
FIG. 8 shows a process for receiving CQI.

FIG. 8 shows a design of a process 800 for receiving CQI. Process 800 may be performed by a base station (as described below) or by some other entity. The base station may receive CQI determined by a UE based on an assumption of a set of precoding matrices being used by the base station for data transmission to the UE (block 812). The base station may send data transmission to the UE based on the CQI (block 814). In one design of block 814, the base station may select at least one MCS based on the CQI. The base station may then process data for the UE based on the at least one MCS.

The base station may perform precoding for the data transmission based on a plurality of precoding matrices to obtain transmit diversity. In one design, the plurality of precoding matrices may include at least one precoding matrix in the set of precoding matrices assumed by the UE. In one design, the plurality of precoding matrices may include at least one precoding matrix not in the set of precoding matrices. In general, the plurality of precoding matrices used by the base station may include zero, some, or all of the precoding matrices in the set of precoding matrices assumed by the UE.

In one design, the base station may receive CQI periodically from the UE and may average the CQI. The base station may send the data transmission based on the averaged CQI. In one design, the base station may adjust the CQI based on a backoff and may send the data transmission based on the adjusted CQI. The base station may also process the CQI from the UE in other manners and may use the processed CQI (instead of the received CQI) for data transmission to the UE.

In one design, the base station may receive RI indicative of a rank selected by the UE. The base station may send L data packets or codewords for the data transmission, where L may be determined based on the rank selected by the UE.

In one design, the UE may be scheduled for data transmission on a subset of the time-frequency resources over which CQI is determined. In another design, the UE may be scheduled on all of the time-frequency resources over which CQI is determined. In one design, the UE may be scheduled for SU-MIMO transmission by the base station. In another design, the UE and at least one other UE may be scheduled for MU-MIMO transmission by the base station. In yet another design, the UE and at least one other UE may be scheduled for CoMP transmission by multiple cells, which may include at least one cell of the base station. The UE may also be scheduled in other manners.

Figure 9:
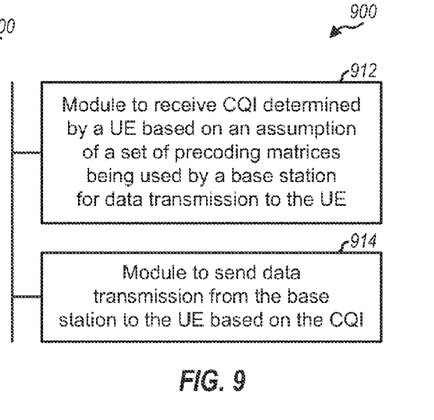
FIG. 9 shows an apparatus for receiving CQI.

FIG. 9 shows a design of an apparatus 900 for receiving CQI. Apparatus 900 includes a module 912 to receive CQI determined by a UE based on an assumption of a set of precoding matrices being used by a base station for data transmission to the UE, and a module 914 to send data transmission from the base station to the UE based on the CQI.

The modules in FIGS. 7 and 9 may comprise processors, electronic devices, hardware devices, electronic components, logical circuits, memories, software codes, firmware codes, etc., or any combination thereof.

Figure 10:
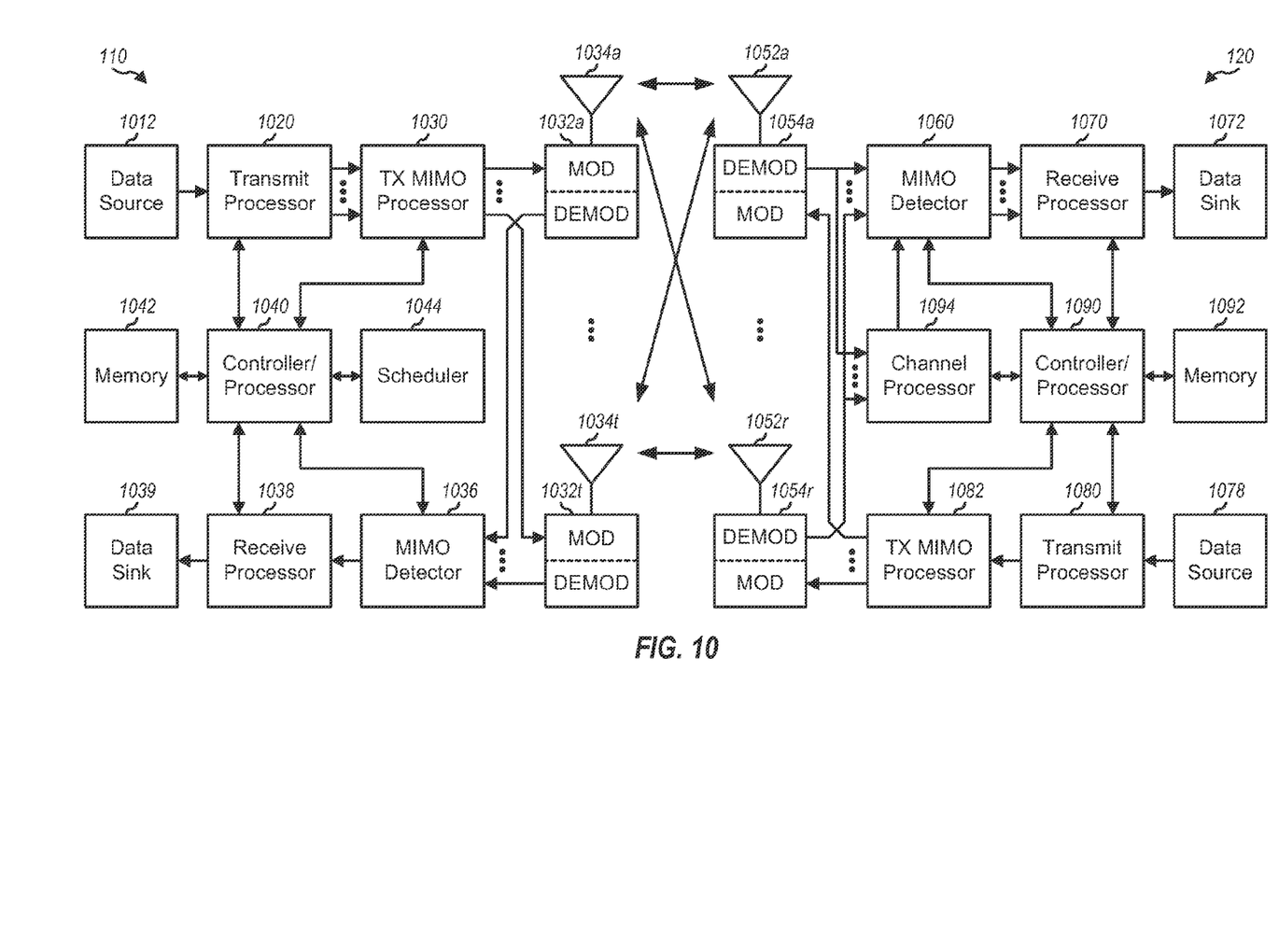
FIG. 10 shows a block diagram of a base station and a UE.

FIG. 10 shows a block diagram of a design of a base station/eNB 110 and a UE 120, which may be one of the base stations/eNBs and one of the UEs in FIG. 1. Base station 110 may be equipped with T antennas 1034a through 1034t, and UE 120 may be equipped with R antennas 1052a through 1052r, where in general T>1 and R≥1.

At base station 110, a transmit processor 1020 may receive data from a data source 1012 for one or more UEs, process (e.g., encode and modulate) the data for each UE based on one or more modulation and coding schemes selected for that UE, and provide data symbols for all UE. Transmit processor 1020 may also process control information and provide control symbols. Transmit processor 1020 may also generate reference symbols for one or more reference signals such as CRS, CSI-RS, UE-RS, etc. A transmit (TX) MIMO processor 1030 may precode the data symbols, the control symbols, and/or the reference symbols (if applicable) and may provide T output symbol streams to T modulators (MOD) 1032a through 1032t. Each modulator 1032 may process its output symbol stream (e.g., for OFDM, etc.) to obtain an output sample stream. Each modulator 1032 may further condition (e.g., convert to analog, filter, amplify, and upconvert) its output sample stream and generate a downlink signal. T downlink signals from modulators 1032a through 1032t may be transmitted via T antennas 1034a through 1034t, respectively.

At UE 120, R antennas 1052a through 1052r may receive the downlink signals from base station 110 and other base stations, and each antenna 1052 may provide a received signal to an associated demodulator (DEMOD) 1054. Each demodulator 1054 may condition (e.g., filter, amplify, downconvert, and digitize) its received signal to obtain samples and may further process the samples (e.g., for OFDM, etc.) to obtain received symbols. Each demodulator 1054 may provide received data symbols to a MIMO detector 1060 and provide received reference symbols to a channel processor 1094. Channel processor 1094 may derive a channel estimate for a wireless channel from base station 110 to UE 120 based on the received reference symbols. Channel processor 1094 may also determine CQI and possibly RI based on the received reference symbols, as described above. Channel processor 1094 may provide the channel estimate to MIMO detector 1060 and may provide the CQI and possibly RI to a controller/processor 1090. MIMO detector 1060 may perform MIMO detection on the received data symbols (if applicable) based on the channel estimate and may provide detected symbols. A receive processor 1070 may process (e.g., demodulate and decode) the detected symbols, provide decoded data for UE 120 to a data sink 1072, and provide decoded control information to controller/processor 1090.

UE 120 may determine CQI and possibly RI as described above. Channel information (e.g., comprising CQI, possibly RI, etc.), other control information, and data from a data source 1078 may be processed by a transmit processor 1080, precoded by a TX MIMO processor 1082 if applicable, further processed by modulators 1054a through 1054r, and transmitted to base station 110. At base station 110, the uplink signals from UE 120 and other UEs may be received by antennas 1034, processed by demodulators 1032, detected by a MIMO detector 1036 if applicable, and further processed by a receive processor 1038 to recover the data and control information sent by UE 120 and other UEs. Processor 1038 may provide the recovered data to a data sink 1039 and may provide the recovered control information and channel information to controller/processor 1040.

Controllers/processors 1040 and 1090 may direct the operation at base station 110 and UE 120, respectively. Processor 1040 and/or other processors and modules at base station 110 may perform or direct process 800 in FIG. 8 and/or other processes for the techniques described herein. Processor 1090 and/or other processors and modules at UE 120 may perform or direct process 600 in FIG. 6 and/or other processes for the techniques described herein. Memories 1042 and 1092 may store data and program codes for base station 110 and UE 120, respectively. A scheduler 1044 may schedule UE 120 and/or other UEs for data transmission on the downlink and/or uplink based on channel information received from all UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
determining, at a user equipment (UE), a channel quality indicator (CQI) using a set of precoding matrices that is assumed by the UE, the set of precoding matrices assumed by the UE being for a set of time-frequency resources available for data transmission to the UE and the UE selecting random precoding matrices for the set of time-frequency resources, the UE assuming the set of precoding matrices for the set of time-frequency resources based on a base station randomly or pseudo-randomly selecting a set of precoding matrices for the data transmission to the UE, wherein the set of precoding matrices assumed by the UE is different from the set of precoding matrices randomly or pseudo-randomly selected by the base station for the data transmission to the UE; and
sending the CQI from the UE to the base station.

2. The method of claim 1, further comprising:
receiving the data transmission sent by the base station to the UE based on the CQI, wherein the data transmission is sent using a plurality of precoding matrices to obtain transmit diversity, at least one of the plurality of precoding matrices being from the randomly or pseudo-randomly selected set of precoding matrices.

3. The method of claim 1, wherein the determining the set of precoding matrices assumed by the UE comprises using a designated precoding matrix for each of the set of time-frequency resources, and wherein the set of precoding matrices assumed by the UE comprises the designated precoding matrix for each time-frequency resource.

4. The method of claim 1, wherein the set of time-frequency resources corresponds to a set of resource blocks, and wherein one precoding matrix in the set of precoding matrices assumed by the UE is used for each resource block in the set of resource blocks.

5. The method of claim 1, wherein the determining the CQI by using the set of precoding matrices assumed by the UE for the set of time-frequency resources comprises:
determining received signal quality of each time-frequency resource of the set of time-frequency resources based on a precoding matrix for the time-frequency resource in the set of precoding matrices assumed by the UE, and
determining the CQI based on received signal qualities of the set of time-frequency resources.

6. The method of claim 5, wherein the determining the received signal quality of each time-frequency resource comprises:
estimating a channel matrix for a wireless channel from the base station to the UE for the time-frequency resource;
determining an effective channel matrix based on the estimated channel matrix and the precoding matrix for the time-frequency resource; and
estimating the received signal quality of the time-frequency resource based on the effective channel matrix.

7. The method of claim 5, wherein the determining the CQI based on the received signal qualities of the set of time-frequency resources comprises:
averaging the received signal qualities of the set of time-frequency resources to obtain an average received signal quality; and
determining the CQI based on the averaged received signal quality.

8. The method of claim 1, further comprising:
determining a set of precoding matrices for each of a plurality of ranks;
determining a metric for each of the plurality of ranks based on the set of precoding matrices for the rank; and
selecting one of the plurality of ranks based on the metric for each rank, and
wherein the CQI is determined based on the set of precoding matrices for the selected rank, and the set of precoding matrices assumed by the UE comprises the set of precoding matrices for the selected rank.

9. The method of claim 8, further comprising:
sending rank indicator (RI) indicative of the selected rank to the base station; and
receiving the data transmission comprising L data packets sent by the base station to the UE based on the CQI, where L is determined based on the selected rank.

10. An apparatus for wireless communication, comprising:
means for determining channel quality indicator (CQI) using a set of precoding matrices that is assumed by a user equipment (UE), the set of precoding matrices assumed by the UE being for a set of time-frequency resources available for data transmission to the UE and the UE selecting random precoding matrices for the set of time-frequency resources, the UE assuming the set of precoding matrices for the set of time-frequency resources based on a base station randomly or pseudo-randomly selecting a set of precoding matrices for the data transmission to the UE, wherein the set of precoding matrices assumed by the UE is different from the set of precoding matrices randomly or pseudo-randomly selected by the base station for the data transmission to the UE; and means for sending the CQI from the UE to the base station.

11. The apparatus of claim 10, further comprising:

means for receiving the data transmission sent by the base station to the UE based on the CQI, wherein the data transmission is sent using a plurality of precoding matrices to obtain transmit diversity, at least one of the plurality of precoding matrices being from the randomly or pseudo-randomly selected set of precoding matrices.

12. The apparatus of claim 10, wherein the means for determining the CQI by using the set of precoding matrices assumed by the UE for the set of time-frequency resources comprises:

means for determining received signal quality of each time-frequency resource of the set of time-frequency resources based on a precoding matrix for the time-frequency resource in the set of precoding matrices assumed by the UE, and means for determining the CQI based on received signal qualities of the set of time-frequency resources.

13. The apparatus of claim 10, further comprising:

means for determining a set of precoding matrices for each of a plurality of ranks;

means for determining a metric for each of the plurality of ranks based on the set of precoding matrices for the rank; and means for selecting one of the plurality of ranks based on the metric for each rank, and wherein the CQI is determined based on the set of precoding matrices for the selected rank, and the set of precoding matrices assumed by the UE comprises the set of precoding matrices for the selected rank.

14. An apparatus for wireless communication, comprising:

at least one processor configured to:

determine channel quality indicator (CQI) using a set of precoding matrices that is assumed by a user equipment (UE), the set of precoding matrices assumed by the UE being for a set of time-frequency resources available for data transmission to the UE and the UE selecting random precoding matrices for the set of time-frequency resources, the UE assuming the set of precoding matrices for the set of time-frequency resources based on a base station randomly or pseudo-randomly selecting a set of precoding matrices for the data transmission to the UE, wherein the set of precoding mattices assumed by the UE is different from the set of precoding matrices randomly or pseudo-randomly selected by the base station for the data transmission to the UE, and send the CQI from the UE to the base station.

15. The apparatus of claim 14, wherein the at least one processor is configured to receive the data transmission sent by the base station to the UE based on the CQI, and wherein the data transmission is sent using a plurality of precoding matrices to obtain transmit diversity, at least one of the plurality of precoding matrices being from the randomly or pseudo-randomly selected set of precoding matrices.

16. The apparatus of claim 14, wherein the at least one processor is configured to:

determine received signal quality of each time-frequency resource of the set of time-frequency resources based on a precoding matrix for the time-frequency resource in the set of precoding matrices assumed by the UE, and determine the CQI based on received signal qualities of the set of time-frequency resources.

17. The apparatus of claim 14, wherein the at least one processor is configured to:

determine a set of precoding matrices for each of a plurality of ranks, determine a metric for each of the plurality of ranks based on the set of precoding matrices for the rank, select one of the plurality of ranks based on the metric for each rank, and determine the CQI based on the set of precoding matrices for the selected rank, and wherein the set of precoding matrices assumed by the UE comprises the set of precoding matrices for the selected rank.

18. A computer program product, comprising:

a non-transitory computer-readable medium comprising:

code for causing at least one computer to determine channel quality indicator (CQI) using a set of precoding matrices that is assumed by a user equipment (UE), the set of precoding matrices assumed by the UE being for a set of time-frequency resources available for data transmission to the UE and the UE selecting random precoding matrices for the set of time-frequency resources, the UE assuming the set of precoding matrices for the set of time-frequency resources based on a base station randomly or pseudo-randomly selecting a set of precoding matrices for the data transmission to the UE, wherein the set of precoding matrices assumed by the UE is different from the set of precoding matrices randomly or pseudo-randomly selected by the base station for the data transmission to the UE, and code for causing the at least one computer to send the CQI from the UE to the base station.

19. A method for wireless communication, comprising:

receiving channel quality indicator (CQI) determined by a user equipment (UE) using a set of precoding matrices that is assumed by the UE, the set of precoding matrices assumed by the UE being for a set of time-frequency resources available for data transmission to the UE and the UE selecting random precoding matrices for the set of time-frequency resources, the set of precoding matrices for the set of time-frequency resources being assumed based on a base station randomly or pseudo-randomly selecting a set of precoding matrices for the data transmission to the UE, wherein the set of precoding matrices assumed by the UE is different from the set of precoding matrices randomly or pseudo-randomly selected by the base station for the data transmission to the UE; and sending the data transmission from the base station to the UE based on the CQI.

20. The method of claim 19, wherein the sending the data transmission comprises selecting at least one modulation and coding scheme (MCS) based on the CQI, and processing data for the UE based on the at least one MCS.

21. The method of claim 19, further comprising:

performing precoding for the data transmission based on a plurality of precoding matrices including at least one precoding matrix in the randomly or pseudo-randomly selected set of precoding matrices.

22. The method of claim 19, further comprising:
performing precoding for the data transmission based on a plurality of precoding matrices including at least one precoding matrix outside the randomly or pseudo-randomly selected set of precoding matrices.

23. The method of claim 19, further comprising:
periodically receiving the CQI from the UE; and
averaging the CQI received periodically from the UE, and wherein the sending the data transmission comprises sending the data transmission based on the averaged CQI.

24. The method of claim 19, further comprising:
adjusting the CQI based on a backoff, and wherein the sending the data transmission comprises sending the data transmission based on the adjusted CQI.

25. The method of claim 19, further comprising:
receiving rank indicator (RI) indicative of a rank selected by the UE, wherein the sending the data transmission comprises sending L data packets for the data transmission, and wherein L is determined based on the selected rank.

26. The method of claim 19, further comprising:
scheduling the UE for the data transmission on at least a subset of the set of time-frequency resources.

27. The method of claim 19, further comprising:
scheduling, by the base station, the UE and at least one other UE for multi-user multiple-input multiple-output (MU-MIMO) transmission.

28. The method of claim 19, further comprising:
scheduling the UE and at least one other UE for coordinated multi-point (CoMP) transmission by multiple cells including at least one cell of the base station.

29. An apparatus for wireless communication, comprising:
means for receiving channel quality indicator (CQI) determined by a user equipment (UE) using a set of precoding matrices that is assumed by the UE, the set of precoding matrices assumed by the UE being for a set of time-frequency resources available for data transmission to the UE and the UE selecting random precoding matrices for the set of time-frequency resources, the set of precoding matrices for the set of time-frequency resources being assumed based on a base station randomly or pseudo-randomly selecting a set of precoding matrices for the data transmission to the UE, wherein the set of precoding matrices assumed by the UE is different from the set of precoding matrices randomly or pseudo-randomly selected by the base station for the data transmission to the UE; and
means for sending the data transmission from the base station to the UE based on the CQI.

30. The apparatus of claim 29, further comprising:
means for performing precoding for the data transmission based on a plurality of precoding matrices including at least one precoding matrix in the randomly or pseudo-randomly selected set of precoding matrices.

31. The apparatus of claim 29, further comprising:
means for performing precoding for the data transmission based on a plurality of precoding matrices including at least one precoding matrix outside the randomly or pseudo-randomly selected set of precoding matrices.

32. The apparatus of claim 29, further comprising:
means for periodically receiving the CQI from the UE; and
means for averaging the CQI received periodically from the UE, and wherein the means for sending the data transmission comprises means for sending the data transmission based on the averaged CQI.

33. The apparatus of claim 29, further comprising:
means for receiving rank indicator (RI) indicative of a rank selected by the UE, wherein the means for sending the data transmission comprises means for sending L data packets for the data transmission, and wherein L is determined based on the selected rank.

\* \* \* \* \*